S. J. PEET.
Screws and Nuts.
No. 138,277.                    Patented April 29, 1873.
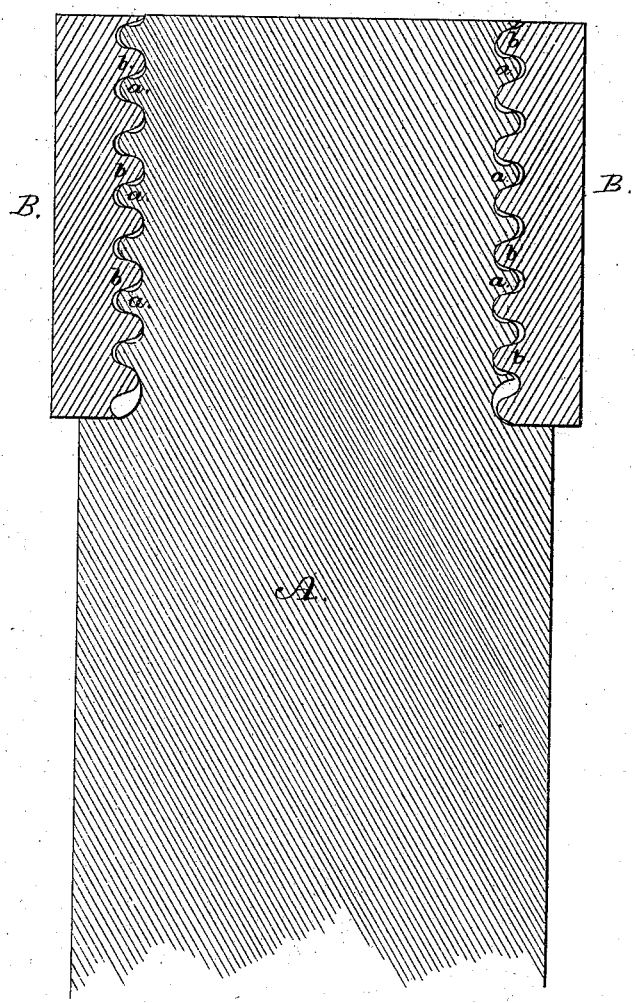
Witnesses.         Samuel J. Peet
Geo. Long.
                   by his attorney
F. C. Hale         H. P. Hale

UNITED STATES PATENT OFFICE.

SAMUEL J. PEET, OF BOSTON, MASSACHUSETTS, ASSIGNOR TO THE PEET VALVE COMPANY, OF SAME PLACE.

IMPROVEMENT IN SCREWS AND NUTS.

Specification forming part of Letters Patent No. 138,277, dated April 29, 1873; application filed October 17, 1872.

*To all whom it may concern:*

Be it known that I, SAMUEL J. PEET, of Boston, in the county of Suffolk and State of Massachusetts, have invented new and useful Improvements in the Manufacture of Screw Bolts and Nuts; and do hereby declare the same to be fully described in the following specification and represented in the accompanying drawing, which denotes a central and longitudinal section of a screw and nut constructed in accordance with my invention.

In the said drawing, A denotes a metallic bar or cylinder having a male screw or thread, $a$, cut or cast upon one of its ends. B is the nut, which has a thread or female screw, $b$, cast or formed upon its inner surface.

Heretofore screw bolts and nuts (counterparts of each other) have had their threads and grooves so made that the exterior surface of each had a continuous bearing upon the other throughout the entire length of the nut. Under this construction it is evident that when either the screw or the nut is turned either for the purpose of connecting or disconnecting the two, the amount of force required or the friction generated is often very great, and much difficulty is experienced in effecting the desired result. It is also well known that this difficulty is greatly increased when such devices have been exposed to moisture or atmospheric influence, the parts often becoming so oxidized and cemented together as to render it impossible to remove the nut without the aid of blows to break the cementing force of the oxidation. The object of my invention is to remedy this evil and to so form the male and female portions of the device as to enable the same, while possessing great strength, to be readily connected or disconnected, as circumstances may require.

In carrying out my invention I cast the bodies, as well as the threads and grooves of the male and female portions of the device, at the same time in molds. The threads and grooves of both the male and female portions I make of a curved U-shape, and with the thread of either the bolt or the nut of such projection as not to impinge at its outer extremity against the contiguous outer portion of the groove in which it works. Furthermore, in order to further lessen the friction of the parts, I cast the upper surface of the thread of the male portion or the under surface of the thread of the female portion with a segmental reduction in order that such reduced portions shall have no bearing upon the corresponding portion of the groove of its counterpart. So, also, in case a very easy or loose working of the parts is desirable, the threads of both the male and female portions may be formed of such diminished area as not to impinge at their outer ends against the contiguous corresponding surface of their grooves. In casting the threads of the male and female portions I form the outer surface of the same of a curved or semicircular shape, and, with the depth of the threads greater than the radius of the circle from which the ends or outer surface of the thread is struck—preferably about double that of the radius—giving to the thread a U-shape in cross-section. By the above-described construction I am enabled to bring the bearings of the parts near the base of the teeth, whereby great strength and absolute certainty against stripping of the threads are secured.

From the above it will be seen that by my peculiar construction of the threads of the screw and nut a larger percentage of the friction incident to devices of this character as commonly constructed is avoided, and thereby a great saving of time and labor is effected.

Having described my invention, what I claim is—

A bolt and nut, the thread of one or both of which is reduced on its periphery and on one of its lateral surfaces, in the manner and for the purposes set forth.

SAMUEL J. PEET.

Witnesses:
F. P. HALE,
F. C. HALE.